United States Patent [19]

Berg

[11] Patent Number: 5,132,944

[45] Date of Patent: Jul. 21, 1992

[54] HALF-HEIGHT MAGNETO-OPTIC DISK DRIVE

[75] Inventor: Thomas E. Berg, Colorado Springs, Colo.

[73] Assignee: Hewlett-Packard Company, Palo Alto, Calif.

[21] Appl. No.: 401,620

[22] Filed: Aug. 31, 1989

Related U.S. Application Data

[63] Continuation-in-part of Ser. No. 246,776, Sep. 20, 1988, Pat. No. 4,977,549.

[51] Int. Cl.$^5$ .......................... G11B 11/00; G11B 7/00; G11B 21/10
[52] U.S. Cl. .................................. 369/13; 369/44.14; 369/44.15; 369/44.18; 369/44.19
[58] Field of Search ................. 369/13, 75.1, 75.2, 369/77.1, 77.2, 215, 216, 44.15, 44.16, 44.17, 44.18, 44.19, 79; 360/113, 114, 96.5, 93, 133, 135

[56] References Cited

U.S. PATENT DOCUMENTS

| | | | |
|---|---|---|---|
| 3,940,148 | 2/1976 | Torrington et al. | 274/4 |
| 3,983,317 | 9/1976 | Glorioso | 178/6.6 |
| 4,013,033 | 3/1984 | Baasch et al. | 369/44.16 |
| 4,135,206 | 1/1979 | Kleuters et al. | 369/44.15 |
| 4,135,721 | 1/1979 | Camerik | 274/1 |
| 4,326,284 | 4/1982 | Elliott | 369/77 |
| 4,340,955 | 7/1982 | Elliott | 369/213 |
| 4,517,617 | 5/1985 | Tsjui et al. | 360/133 |
| 4,519,055 | 5/1985 | Gilson | 369/37 |
| 4,545,045 | 10/1985 | Baer et al. | 369/77 |
| 4,545,046 | 10/1985 | Jensen et al. | 369/111 |
| 4,557,564 | 12/1988 | Van Rosmalen | 350/255 |
| 4,600,743 | 7/1987 | Araki | 369/44.16 |
| 4,669,073 | 5/1987 | Wakabayshi et al. | 369/44.19 |
| 4,710,910 | 12/1987 | Ejiri | 369/77.2 |
| 4,736,356 | 4/1988 | Konshak | 369/77.2 |
| 4,752,922 | 6/1988 | MacAnally et al. | 369/32 |
| 4,766,583 | 8/1988 | Oinoue et al. | 369/44.16 |
| 4,794,586 | 12/1988 | Korth | 369/215 |
| 4,802,041 | 1/1989 | Uehara | 369/77.2 |
| 4,811,137 | 3/1989 | Moto et al. | 369/77.2 |
| 4,823,214 | 4/1989 | Davis | 360/97.01 |
| 4,829,504 | 5/1989 | Sunaga et al. | 369/77.2 |
| 4,882,723 | 4/1989 | Van Rosmalen | 369/44.16 |
| 4,887,888 | 12/1989 | Nose | 369/44.17 |
| 4,935,829 | 6/1990 | Sasaki | 360/93 |
| 4,979,161 | 12/1990 | Uerhagen | 369/77.2 |

FOREIGN PATENT DOCUMENTS 0020732  1/1988  Japan ............................... 369/44.19

OTHER PUBLICATIONS

Roger Jean Segalat, "Ballpoint Pen", How Things Work.

Primary Examiner—Stuart S. Levy
Assistant Examiner—Tan Nguyen

[57] ABSTRACT

A magneto-optic disk drive includes cartridge-receiving guide tracks and a push-latch mechanism mounted in an upper portion of a half-hight enclosure, and a baseplate assembly pivotally mounted in a lower portion of the enclosure. The baseplate assembly includes a baseplate, a drive motor and spindle mounted to the baseplate, and a rotary arm mounted to the baseplate by a pivot mechanism. Optical head components including a focusing and bias field switching assembly are mounted to the rotary arm. A tracking motor includes coils mounted to an end of the rotary arm directly adjacent to the focusing and bias field switching assembly, and permanent magnets mounted to the baseplate. An optical disk cartridge is pushed into the drive and latched into its inserted position when the baseplate assembly is in a load/unload position. A baseplate drive mechanism raises the baseplate assembly to its operative position causing the drive motor and spindle to engage and rotate the optical disk. The tracking motor drives the rotary arm about a tracking axis allowing data to be written, read and erased on the disk. Cartridge removal is initiated by pressing a stop switch. After the disk spins down to a stop the baseplate assembly is driven to its load/unload position. When pushed, the cartridge is unlatched and ejected from the drive.

17 Claims, 12 Drawing Sheets

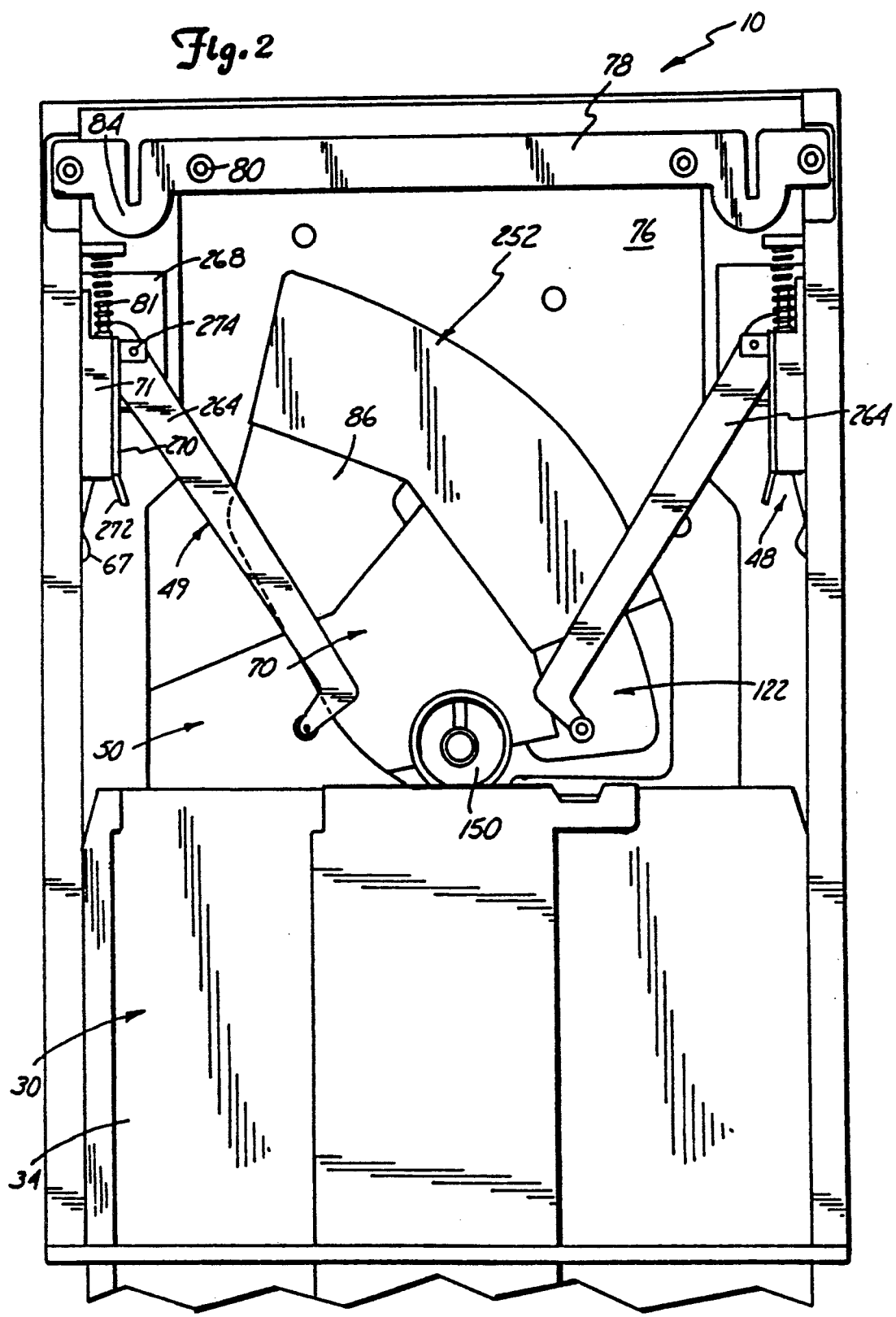

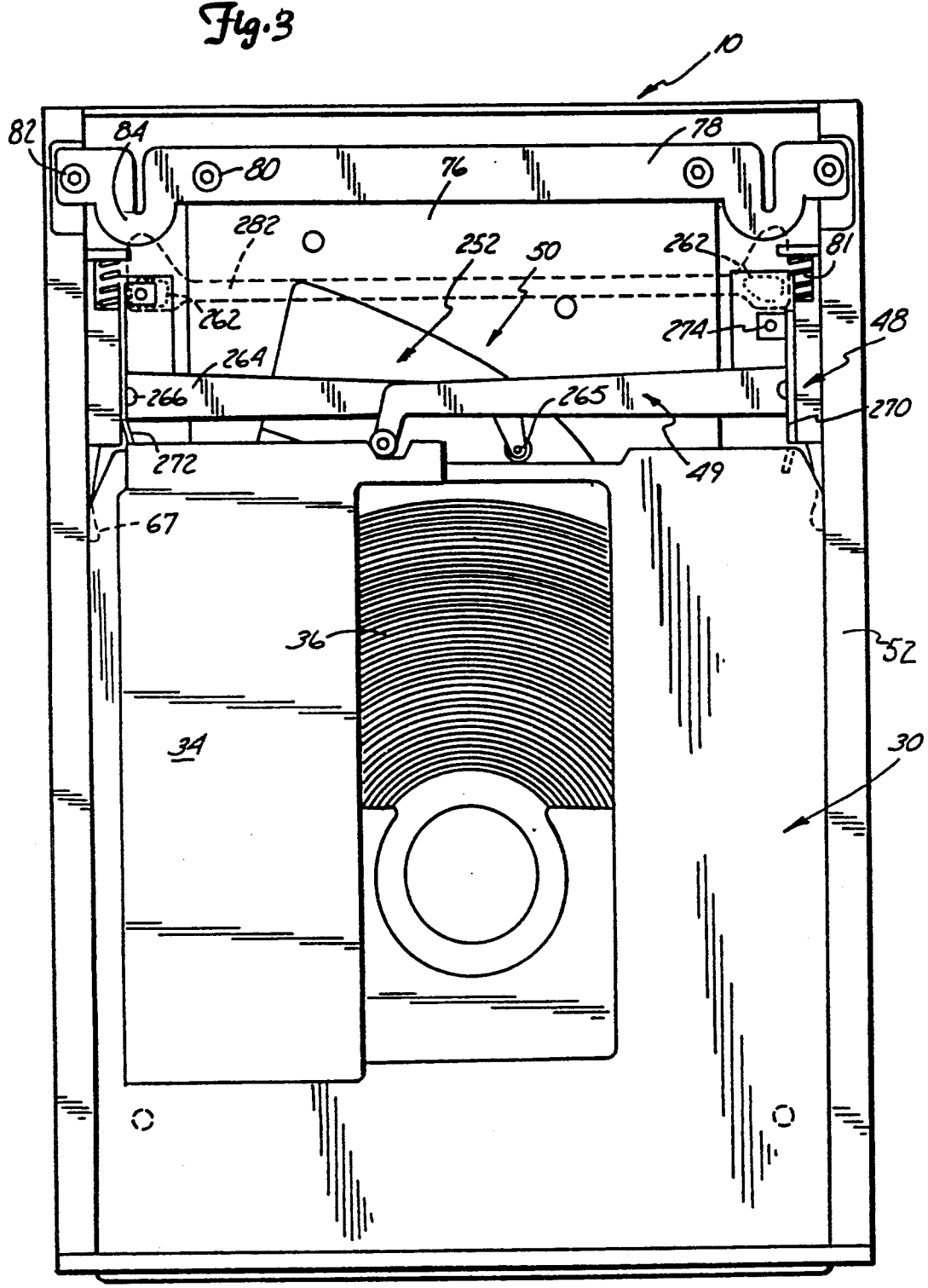

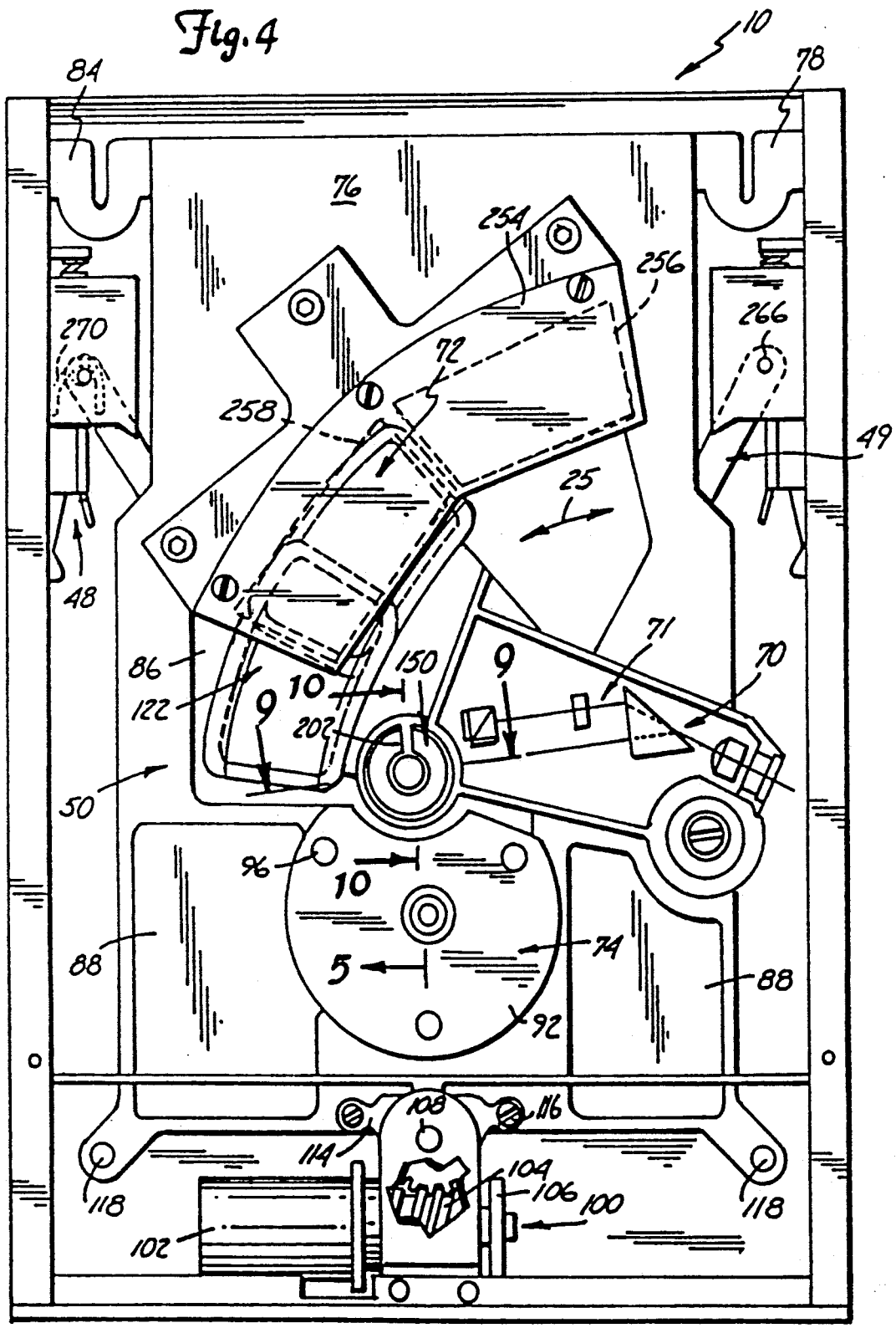

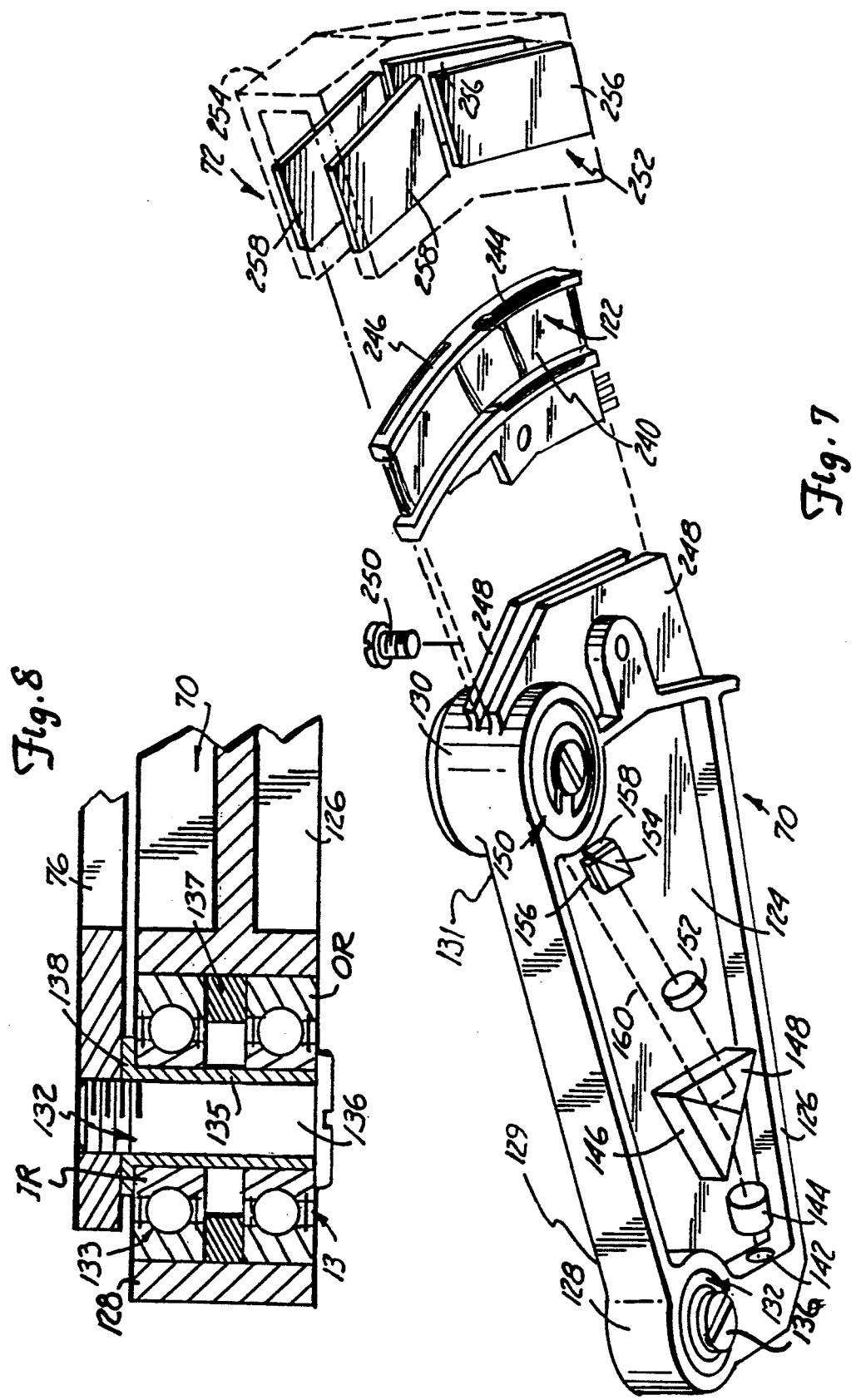

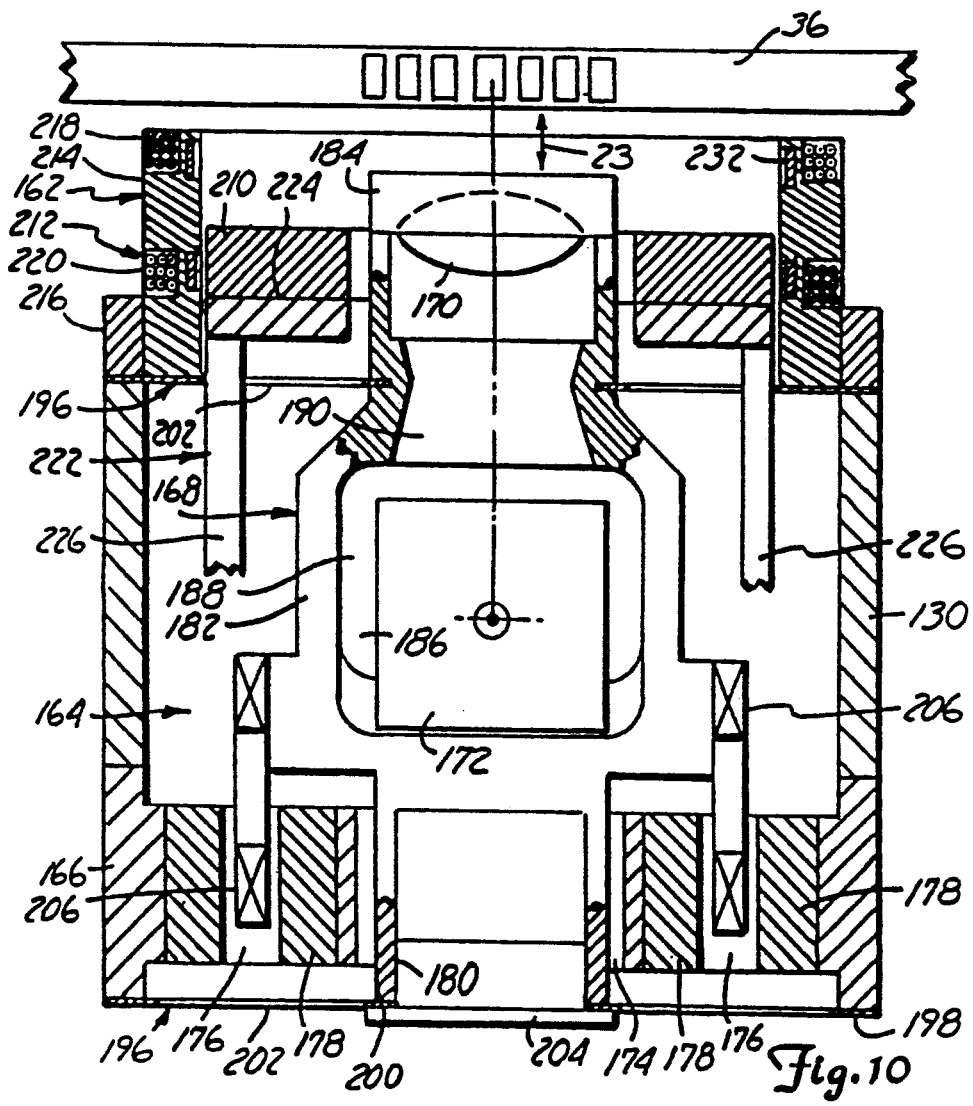

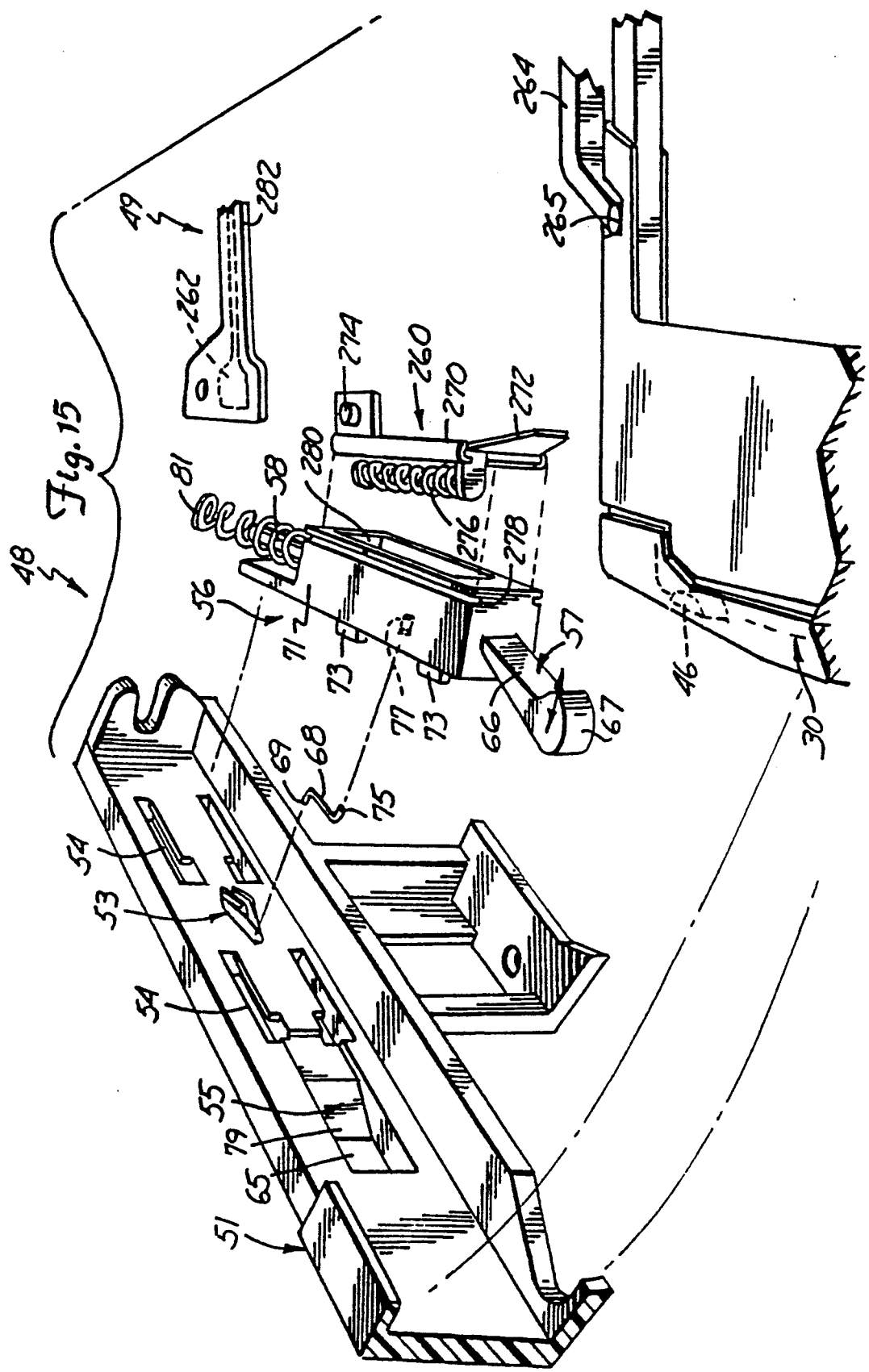

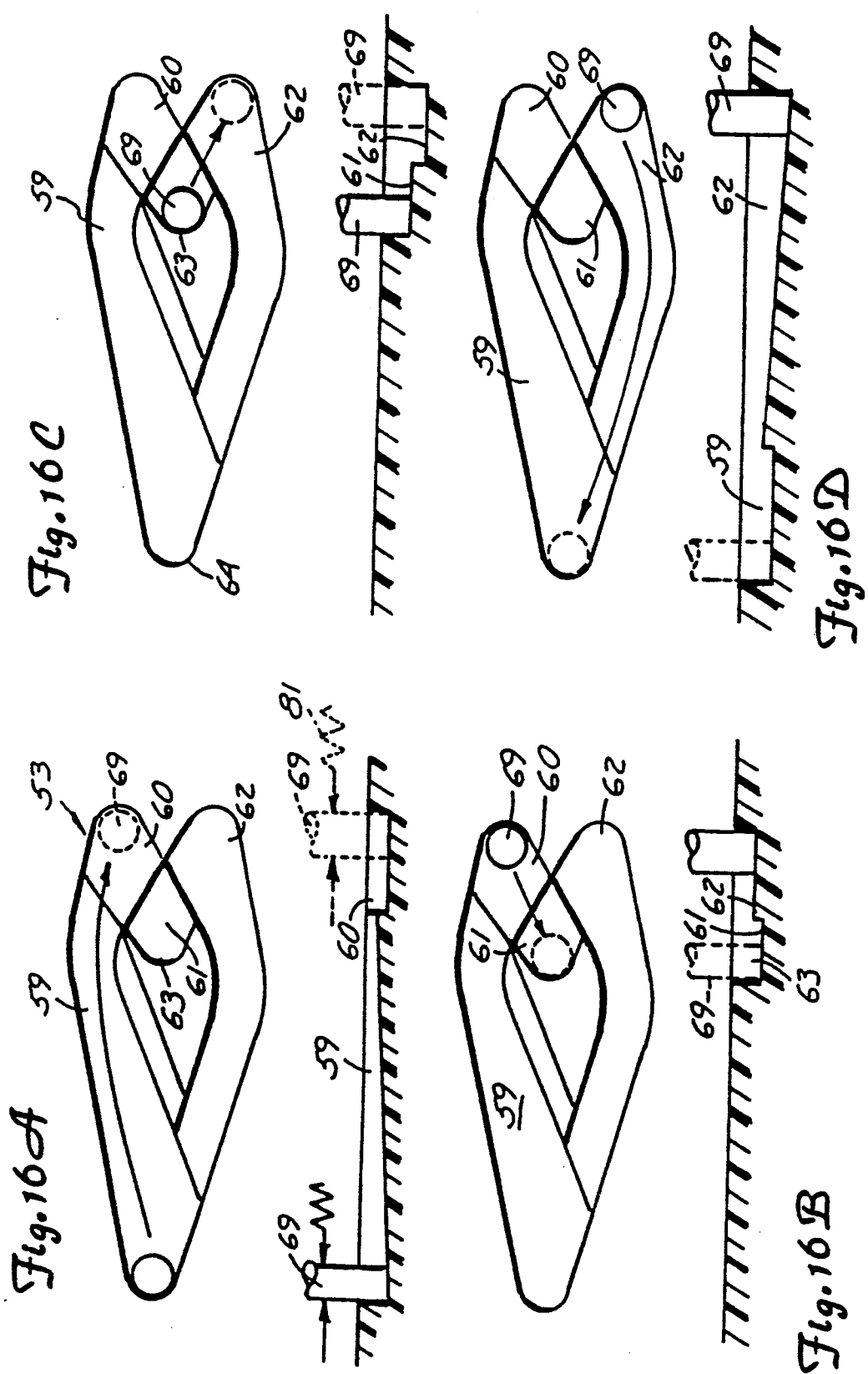

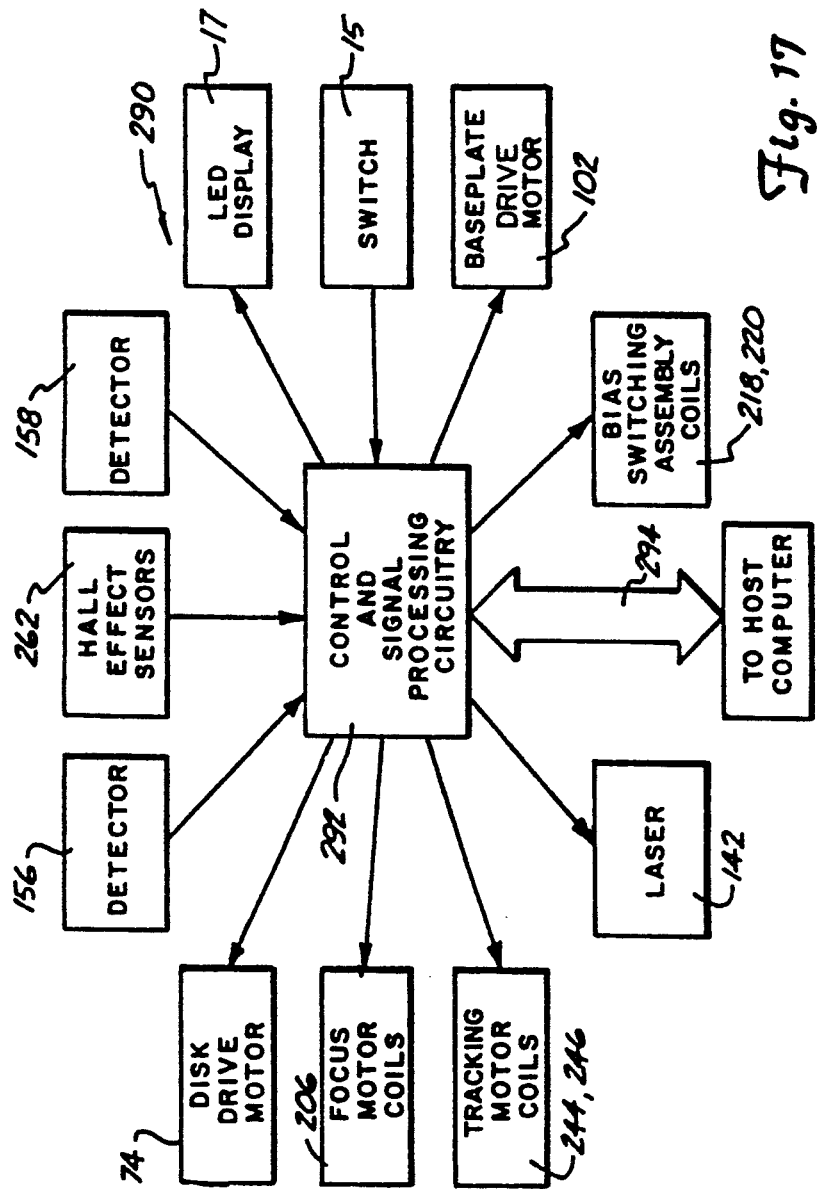

HALF-HEIGHT MAGNETO-OPTIC DISK DRIVE

REFERENCE TO PRIOR PENDING APPLICATION

This application is a continuation-in-part of prior pending U.S. patent application Ser. No. 07/246,776, filed Sept. 20, 1988, now U.S. Pat. No. 4,977,549.

BACKGROUND OF THE INVENTION

1. Field of the Invention

The present invention relates generally to drive mechanisms for disk-type recording media. In particular, the present invention is a magneto-optic disk drive.

2. Description of the Prior Art

Magneto-optic data recording technology combines the erasability features of magnetic data storage systems with the high data storage capacity of optical systems. A five and one-quarter inch magneto-optic disk can hold up to six hundred M bits of information, which is one thousand or more times the amount of information presently stored by a magnetic floppy diskette of similar size. Magneto-optic disks are also transportable and can be transferred between drives. Since the read, write and erase operations are performed with light beams rather than mechanical heads, they have long life, high reliability, and are relatively immune to physical wear.

The principles of magneto-optic technology are well known. Information is digitally stored at bit positions on a magneto-optic disk. Typical bit positions have a diameter of 0.8 to 2.0 microns. The orientation of the magnetic field at each bit position can be switched between a digital one state in which its north pole is oriented upward, and a digital zero state in which the magnetic field is reversed and the north pole is oriented downward. The orientation of the magnetic field at each bit position is selected by subjecting the bit position to the magnetic field of the appropriate polarity, and heating the bit position of the disk. The magnetic orientation of the bit position is frozen when the disk cools and returns to room temperature.

The magnetic fields of all bit positions in unwritten disks will generally be oriented north poles down to represent a digital zero When writing information, the bit positions will be subjected to a write magnetic bias field and heated by a high intensity laser beam. The orientation of the magnetic fields at the written bit positions will then reverse to north poles up. Bit positions are erased by subjecting them to an erase bias field of the opposite polarity, and again heating the bit. The magnetic field orientation at the erased bit positions will then reverse and switch to north poles down.

Data is read from the optical disk using a low-power laser beam. Because of the magneto-optic phenomena known as the Kerr-effect, the polarization of a laser beam impinged upon the bit positions will be rotated as a function of the magnetic orientation of the bit. The polarization of the laser beam portions reflected from bit positions on the optical disk is detected by optoelectronic detector circuitry. Signals from the detector circuitry are processed to determine whether the bit position is representative of a digital one or a digital zero.

For purposes of convenience and protection, the optical disk is typically positioned within an enclosure to form a cassette. The cassette is loaded into an optical disk drive which is interfaced to a personal computer or other data processing system and includes the mechanical and electrical subsystems required to write, read and erase data on the optical disk. Optical disk drives typically include an optical head having an objective lens for focusing the laser beam onto the optical disk, a drive motor for rotating the optical disk, a focus servo system and a tracking servo system. After the cartridge is inserted into the drive and its door is opened, the disk drive motor and optical head are moved with respect to the optical disk to bring the drive motor and disk into engagement, and the optical head into its operating position adjacent the disk. In one known drive the optical head and drive motor are mounted to a frame pivotally suspended within the drive to form an assembly. After the disk is loaded into the drive, the assembly is driven to an operative position at which the drive motor engages the disk and the optical head is positioned adjacent the disk. The cartridge is loaded into and removed from the drive when the assembly is in a load/unload position spaced from the disk.

The tracking servo system is a closed force-position loop which includes an actuator for driving and positioning the optical head or objective lens about a tracking axis with respect to servo tracks on the optical disk. In one known CD player the optical head is positioned on an elongated arm opposite a pivot mechanism from a counterweight. The arm and optical head are driven about a tracking axis by a pair of electromagnetic motors, one positioned between the pivot mechanism and each of the optical head and counterweight. Another known magnetic disk drive includes a V-shaped arm having two legs. The arm is movably mounted adjacent the disk by a pivot mechanism located at the arm vertex. The magnetic head is mounted at the free end of one arm, while the electromagnetic motor is mounted to the free end of the other. Pivot bearing and arm dynamics, including play in the bearing and bending of the arm, significantly affect the overall performance of these tracking servo systems.

The focus servo system, also a closed force-position loop, includes a focus actuator which drives and positions the objective lens about a focus axis with respect to the optical disk. The focus servo system controls the focus actuator in such a manner as to keep the laser beam properly focused onto the optical disk. Linear electromagnetic motors are typically used as actuators.

Other known optical disk drive mechanisms and associated tracking and focus servo systems are disclosed generally in the following United States patents:

| | |
|---|---|
| 3,940,148 | Torrington et al. |
| 3,983,317 | Glorioso |
| 4,135,721 | Camerik |
| 4,326,284 | Elliott |
| 4,340,955 | Elliott |
| 4,517,617 | Tsuji et al. |
| 4,519,055 | Gilson |
| 4,545,045 | Baer et al. |
| 4,545,046 | Jansen et al. |
| 4,736,356 | Konshak |
| 4,752,922 | MacAnally et al. |

It is evident that there is a continuing need for improved optical disk drives. Mechanical systems of the drive must be compact and reliable. The effects of physical component dynamics upon tracking servo system response should be mitigated as much as possible to increase the performance of the drive. The drive should also be relatively uncomplicated to facilitate its assembly in an economically feasible manner. A half-height drive having these characteristics would be especially desirable.

SUMMARY OF THE INVENTION

An optical disk drive in accordance with the present invention includes an enclosure, drive means mounted within the enclosure for receiving and rotating an optical disk, and a rotary arm. Pivot means pivotally mount the rotary arm with respect to the enclosure for rotary movement of the arm in a plane parallel to the disk. An objective lens mounted to the rotary arm focuses a laser beam onto the optical disk. Tracking motor means drive the rotary arm at a location opposite the objective lens from the pivot means to position the objective lens about a tracking axis.

In one embodiment a distributed optical head including a laser, optical means for propagating a laser beam between the laser and objective lens, and detector means, are mounted to the rotary arm. The drive means includes a drive motor and spindle.

Another embodiment of the drive is adapted for use with an optical disk cartridge. The rotary arm and the drive motor and spindle are mounted to a baseplate. The tracking motor means includes coils mounted to the arm opposite the objective lens from the pivot means, and permanent magnets mounted to the baseplate adjacent the coils. The baseplate is pivotally mounted within the enclosure below a cartridge receiving and push-latch mechanism.

With the baseplate in a load/unload position, the optical disk cartridge can be pushed into the drive and latched into an inserted position. A door opening mechanism opens a cartridge door to expose the disk as the cartridge is inserted. A baseplate drive motor is actuated to raise the baseplate to an operative position with the drive motor and spindle engaged with the optical disk, and the rotary arm and objective lens positioned adjacent thereto. Data can then be written, read, and erased at bit positions on the optical disk.

A stop switch is actuated when it is desired to remove the cartridge. After the disk has spun down to a stop the baseplate drive motor is actuated and lowers the baseplate to its load/unload position. When pushed, the cartridge is unlatched and ejected from the drive.

BRIEF DESCRIPTION OF THE DRAWINGS

FIG. 2 is a view of the drive shown in FIG. 1 with the top panel removed and the optical disk cartridge partially inserted.

FIG. 3 is another illustration of the drive shown in FIG. 1, with the top panel removed and the cartridge fully inserted.

FIG. 4 is a bottom view of the drive shown in FIG. 1, with the bottom panel removed.

FIG. 7 is a detailed exploded view of the rotary arm shown in FIG. 4.

FIG. 8 is a detailed sectional view of the arm pivot mechanism shown in FIG. 7.

FIG. 10 is a sectional view of the focus and bias field switching assembly taken along lines 10—10 in FIG. 4.

FIG. 15 is a detailed exploded view of the cartridge guide and latching assembly.

FIGS. 16A–16D are detailed views of the cardioid cam shown in FIG. 15 and illustrating the push-latch operation of the latch mechanism.

FIG. 17 is a block diagram representation of an electrical system of the disk drive.

DETAILED DESCRIPTION OF THE PREFERRED EMBODIMENTS

Figure 1:
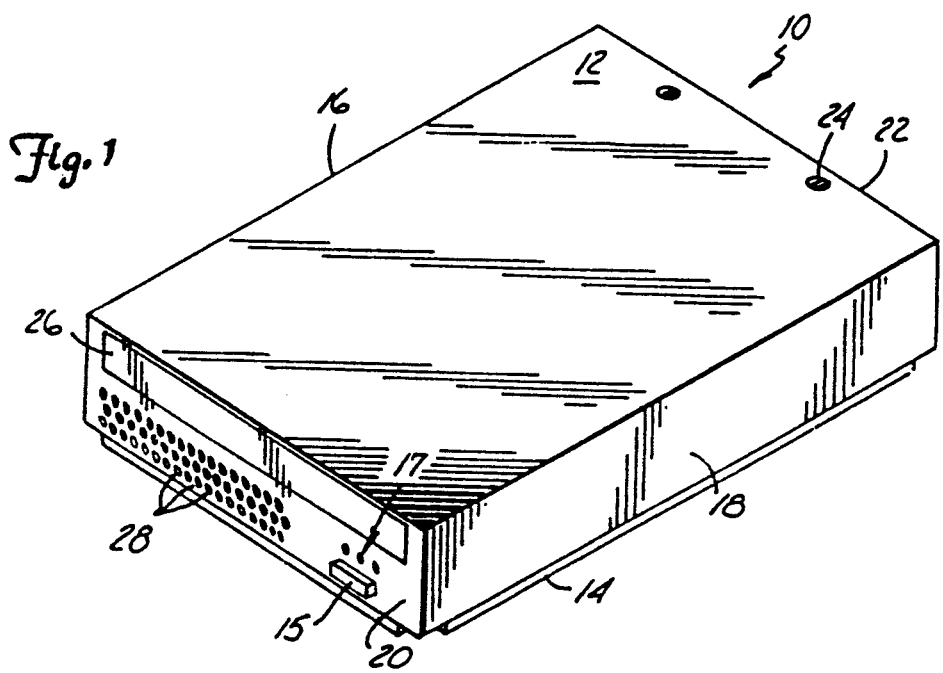
FIG. 1 is a perspective view illustrating the optical disk drive of the present invention.
Figure 11:
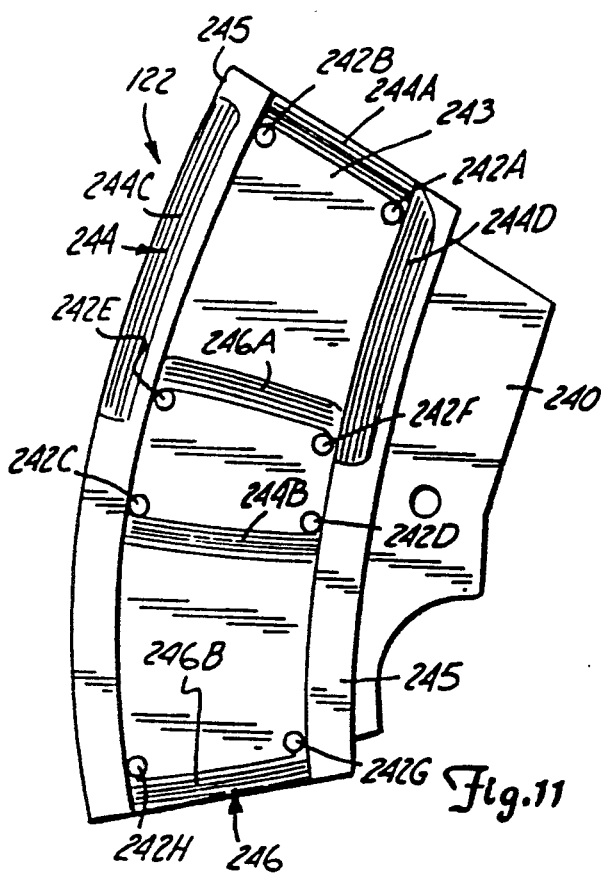
FIG. 11 is a detailed view of the tracking coil assembly.
Figure 12:
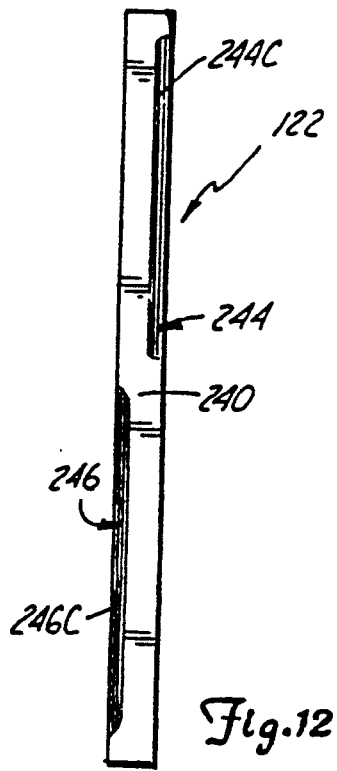
FIG. 12 is a side view of the tracking coil assembly.

A magneto-optic disk drive 10 in accordance with the present invention is illustrated generally in FIG. 1. Mechanical and electrical systems of drive 10 are compactly mounted within a half-height chassis or enclosure which can be positioned in a personal computer (not shown). The enclosure includes top panel 12, bottom panel 14, left side panel 16, right side panel 15, front panel 20 and back panel 22. Panels 12-22 can be fastened together by screws such as 24 and brackets (not shown) which extend from the inside surfaces of the panels. A cartridge-receiving opening in front panel 20 is enclosed by door 26. Door 26 is pivotally mounted to front panel 20 and is biased to a normally closed position. A plurality of ventilation holes 28 in front panel 20 facilitate the circulation of air through disk drive 10 for cooling purposes. A stop switch 15 and LED display 17 are also mounted to front panel 20. Display 17 provides a visual indication of the operating status of drive 10. Stop switch 15 is actuated when it is desired to stop drive 10 and remove the cartridge (FIGS. 2-3).

Figure 13:
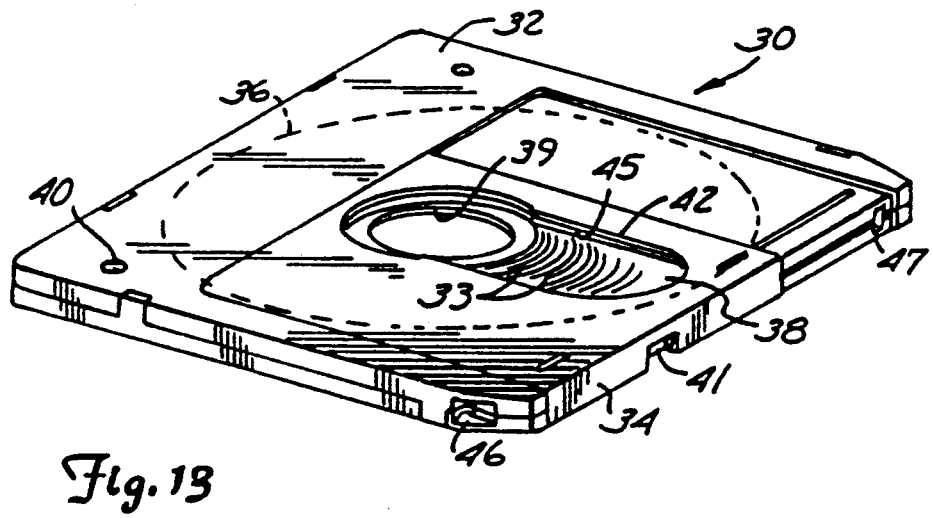
FIG. 13 is a perspective view of the optical disk cartridge used with the optical disk drive of the present invention, and shown with its door in an open position.
Figure 14:
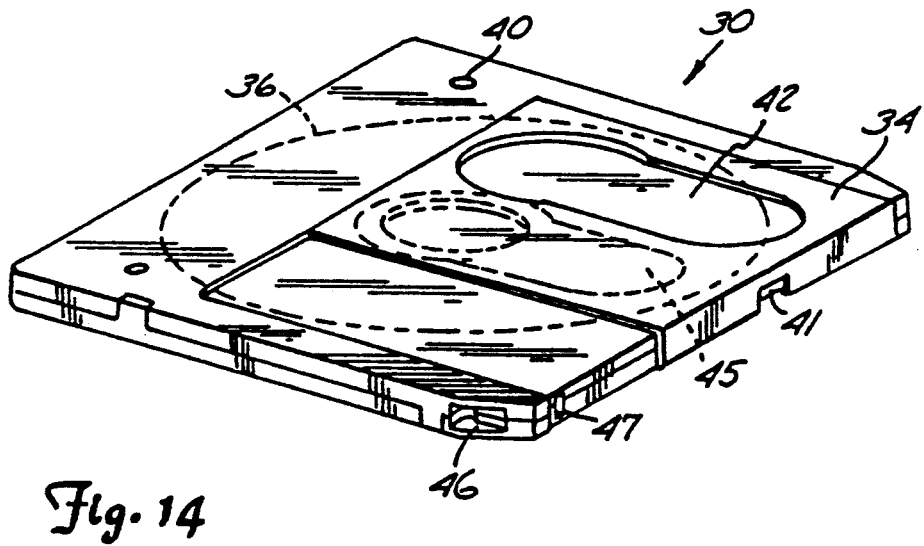
FIG. 14 is a view of the optical disk cartridge shown in FIG. 13 with its door in a closed position.

Disk drive 10 is configured to use commercially available five and one-quarter inch optical disk cartridges 30 such as that illustrated in FIGS. 13 and 14. Cartridge 30 includes an enclosure 32, a sliding door 34, and a magneto-optic disk 36 positioned within the enclosure. The perimeter of disk 36 is illustrated in phantom in FIGS. 13 and 14. Disk 36 includes a pair of opposed recording surfaces 38 mounted about a hub 39. Data is stored in circular servo tracks 33 which are radially spaced about disk 36. The top and bottom of enclosure 32 have a pair of holes 40 which are engaged by locating pins 118 (FIG. 4) when cartridge 30 is positioned in drive 10. Both sides of enclosure 32 include recesses 46 which are engaged by latch clips (FIG. 15) to further secure cartridge 30 in drive 10. A pair of door sensor recesses 47 extend into opposite sides of the rear edge of enclosure 32.

Although only one side of enclosure 32 and door 34 is shown in FIGS. 13 and 14, the opposite sides of these elements are identical. Door 34 includes a recess 41 which is engaged by a door opening mechanism (FIGS. 2 and 3) to slide the door to its open position. Both sides of door 34 include an opening 42. When in its open position shown in FIG. 13, openings 42 of door 34 will be positioned over openings 45 of a similar size and shape in both the bottom and top of enclosure 32, thereby exposing hub 39 and recording surfaces 38 of disk 36. When cartridge 30 is not in use, door 34 is biased by a spring (not shown) to a closed position shown in FIG. 14. When in its closed position door 34 covers openings 45 and protectively encloses optical disk 36 within enclosure 32.

A mechanical system of disk drive 10 is illustrated generally in FIGS. 2-4. The mechanical system includes cartridge retaining mechanism 48, cartridge door opening and sensor mechanism 49, baseplate assembly 50 and baseplate assembly drive mechanism 100. Baseplate assembly 50 includes rotary arm 70, optical assembly 71, tracking motor 72 and drive motor and spindle assembly 74, all of which are mounted to baseplate 76.

Once inserted into drive 10, cartridge 30 is securely latched in its inserted position by cartridge retaining mechanism 48. Cartridge door opening and sensor mechanism 49 opens cartridge door 34 as cartridge 30 is being inserted, and provides signals to the electrical system (FIG. 17) indicating whether or not the door has been properly opened. If cartridge door 34 is completely opened, drive mechanism 100 will raise baseplate assembly 50 from a lower or load/unload position to an upper or operative position. Drive motor and spindle assembly 74 engages and rotates disk 36 when baseplate assembly 50 is in its operative position. Tracking motor 72 drives and positions arm 70 about a tracking axis 25 with respect to servo tracks 33 on disk 36 as information is written, read and erased at bit positions by optical assembly 71. The removal of cartridge 30 from disk drive 10 is initiated when an operator presses stop switch 15. This action causes drive motor and spindle assembly 74 to spin down to a stop, after which drive mechanism 100 will lower baseplate assembly 50 to its load/unload position. Cartridge 30 can then be removed from drive 10.

Cartridge retaining mechanism 48 and door opening and sensor mechanism 49 can be described with reference to FIGS. 2-4 and 15-16. Cartridge retaining mechanism 48 includes a pair of cartridge guides 51, one of which is secured to each side panel 16 and 15. Guides 51 include generally U-shaped cartridge edge receiving guide tracks 52 which extend rearwardly from the forward ends of side panels 15 and 16 for a distance equal to the length of cartridge 30. After it is inserted into drive 10 through door 26, the edges of cartridge 30 enter guide tracks 52. Guide tracks 52 guide cartridge 30 into drive 10 and support the cartridge in its inserted position.

A latch cam recess 53, latch guide recesses 54 and latch clip recess 55 are all formed in the side wall of each guide 51, rearwardly of the associated guide track 52. Recesses 53, 54 and 55 all cooperate with a sliding latch member 56 which includes a hollow body 71, guide lugs 73, latch clip 57 and spring guide pin 58. As best shown in FIGS. 16A-16D, latch cam recess 53 includes four ramping track sections 59-62 which are separated by ledges and arranged in a cardioid pattern to form a closed one-way or unidirectional path having a cartridge release stop position 63 and a cartridge latch stop position 64. Each retainer clip recess 55 has an inner wall 65 and a sloping wall 79 which slopes out of recess 55 from the inner wall as it extends rearwardly along associated guide 51. Latch members 56 can be one-piece molded plastic members. Each latch clip 57 includes a living hinge section 66 which slopes toward the side of the latch 56 having guide lugs 73 as it extends from body 71. Each living hinge section 66 is terminated by an elongated tab 67.

Latch members 56 are guided in reciprocal forward and rearward motion along guides 51 by guide lugs 73 which extend into latch guide recesses 54. A cam follower such as Z-shaped pin 68 is associated with each latch member 56 and has an end 75 which fits into hole 77 in the latch member and an end 69 which extends into and rides within tracks 59-62 of latch cam recess 53. Latch members 56 are biased toward the front of drive 10 by springs 81 which extend around guide pins 58.

Latch members 56 function as push-type or touch-type latches. When cartridge 30 is not in disk drive 10, ends 69 of pins 68 will be in release stop positions 64 of cam recesses 53. Latch clips 57 will extend into latch clip recesses 55 when latch members 56 are in this position, with living hinge section 66 resting adjacent sloping side walls 79 and tabs 67 adjacent walls 65. As cartridge 30 is pushed into disk drive 10, and guided to its inserted position by guide tracks 52, its rearward edge will slide past latch clips 57 and engage the forward edge of latch members 56. Further motion of cartridge 30 as it is pushed into drive 10 will force latch members 56 rearwardly against the bias force of springs 81, with ends 69 of pins 68 traveling along track sections 59 and into track sections 60 as shown in FIG. 16A. This rearward motion of latch members 56 forces latch clip tabs 67 out of recesses 55 and into recesses 46 of cartridge 30 as the tabs slide along sloping walls 79. After it has been fully inserted in this manner, the operator will release pressure on cartridge 30, causing springs 81 to push the cartridge and latch members 56 forward until ends 69 of pins 68 come to rest in cartridge latch stop positions 63 as shown in FIG. 16B. Cartridge 30 is thereby securely latched into is inserted position.

Cartridge 30 is unlatched and ejected from disk drive 10 by a complementary push or touch motion. Pushing cartridge 30 into drive 10 causes ends 69 of pins 68 to travel along track sections 61 and into track sections 62 as shown in FIG. 16C. When pressure on cartridge 30 is thereafter released, springs 81 will force latch members 56 and cartridge 30 forward as pin ends 69 traverse track sections 62 and return to release stop positions 63 in track sections 61. Latch clips 57 will then retract into recesses 55, releasing cartridge 30. Release stop positions 64 are forwardly of latch stop positions 63 by a distance which causes the forward end of cartridge 30 to extend out of door 26. An operator can then grasp cartridge 30 and pull it out of drive 10.

Door opening and sensor mechanism 49 includes a pair of sliding feeler assemblies 260, a pair of Hall-effect sensors 262 and left and right cartridge door opening links 264. Door opening links 264 are elongated members pivotally mounted by pins 266 to downwardly extending sections 268 of cartridge guides 11. Both links 264 includes a door engaging lug 265 at their free ends. Coil springs 270 (FIG. 4) bias links 264 to the extended positions shown in FIG. 2. Right opening link 264 is positioned at a height equal to that of the top surface of cartridge 30 when the cartridge is loaded into the drive. Left opening link 264 extends parallel to the lower edge of cartridge 30, below right link 264.

As cartridge 30 is slid into disk drive 10 along guides 51 recess 41 in cartridge door 34 will be engaged by lug 265 of one of opening links 264, depending upon which way the cartridge is oriented. In the example shown in FIGS. 2-3, door 34 is biased toward the right and recess 41 is engaged by right link 264. Continued inward motion of cartridge 30 causes door links 264 to retract against the bias force of springs 270. As they retract, the link 264 which engaged cartridge door 34 will slide the door open. Since they are positioned at different heights, left and right links 264 will not interfere with one another. In the illustrated example, the right link will pass over the left link, with lug 265 of the left link sliding along the lower rear edge of cartridge 30. As cartridge 30 is removed from drive 10, the spring (not shown) in door 34 will force the door back to its closed position. Door opening links 264 will be returned to their extended positions by springs 270.

Feeler assemblies 260 are slidably mounted to latch members 56 and each includes a slide mount 270, forwardly extending feeler tab 272, permanent magnet 274 and spring 276. Slide mounts 270 engage grooves 278 in latch members 56, while springs 276 fit within cavities 280 in the latch members. Springs 276 bias feeler assemblies 260 to a forward position shown in FIG. 2, with feeler tabs 272 extending beyond the forward edge of latch member bodies 71. Hall-effect sensors 262 are mounted to a support 282 and positioned at a location displaced from and not aligned with magnets 274 when feeler assemblies 260 and latch members 56 are in their forwardmost positions.

Feeler tabs 272 are positioned adjacent door sensor recesses 47 of cartridge 30 when the cartridge is inserted into drive 10. If cartridge door 34 is fully opened when cartridge 30 is inserted into drive 10, one of door sensor recesses 47 will be covered by the door. Tab 272 of the feeler assembly 260 on the side of drive 10 adjacent door 34 will then be engaged by the door and forced rearwardly with respect to the associated latch member 56, moving the assemblies' magnet 274 under and adjacent to the associated Hall-effect sensor 262. The other feeler tab 272 will enter sensor recess 47 since it is not covered by door 34, preventing the slide mount 270 and associated magnet 274 from sliding rearwardly with respect to latch body 71. As a result, if door 34 is properly opened, one of sensors 262 will sense the presence of a magnet 274 and provide signals representative thereof. If cartridge door 34 was not opened, feeler tabs 272 of assemblies 260 on both latch members 56 would enter sensor recesses 47. Neither sensor 262 would then provide signals representative of a sensed magnet 274. The signals from Hall-effect sensors 262 can therefore be used by electrical subsystem 290 (FIG. 17) to determine whether or not cartridge door 34 has been fully opened.

Figure 5:
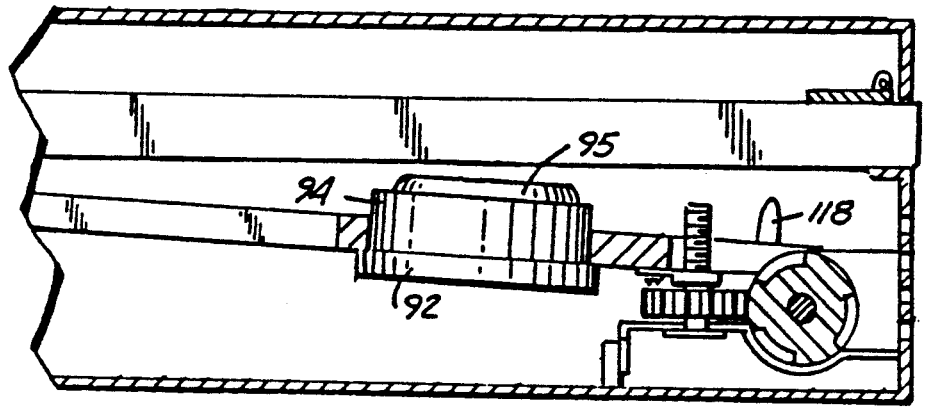
FIG. 5 is a partial sectional view of the drive taken along lines 5—5 in FIG. 4 and showing the baseplate assembly in its load/unload position.
Figure 6:
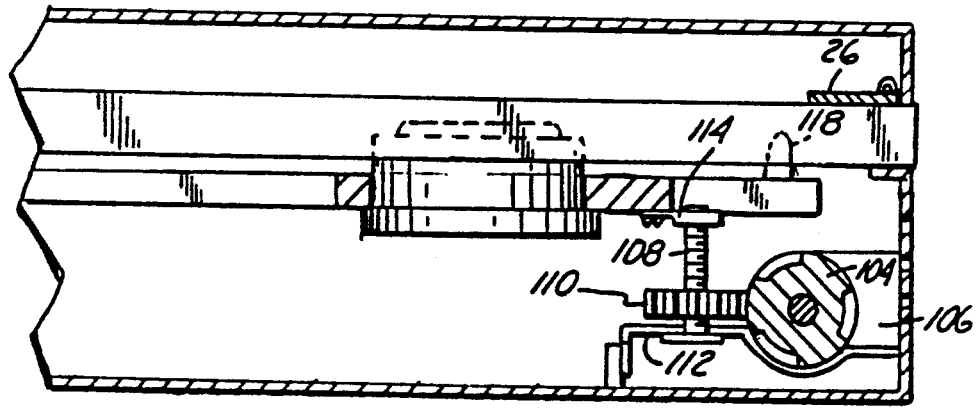
FIG. 6 is a partial sectional view of the drive taken along lines 5—5 in FIG. 4, and showing the baseplate assembly in its operative position.

Baseplate assembly 50 can be described generally with reference to FIG. 4, which is a bottom view disk drive 10 with bottom panel 14 removed. Rotary arm 70, tracking motor 72 and drive motor and spindle assembly 74 are all mounted to baseplate 76. Baseplate 76 and all elements mounted thereto are pivotally suspended within disk drive 10 below guides 51 by flexure member 78. As shown in FIG. 3, flexure member 78 is an elongated piece of tempered spring steel which extends along the back edge of baseplate 76, and is fastened to the top surface of the baseplate by screws 80. Opposite ends of flexure member 78 are fastened to brackets extending from side panels 16 and 18 by screws 82. U-shaped portions 84 are formed in flexure member 78 between the edges of baseplate 76 and panels 16 and 18 to prevent destructive forces on the flexure member as baseplate assembly 50 is driven between its load/unload position and its operative position. Baseplate 76 is a generally planar member which includes a disk access aperture 86, a pair of structural apertures 88, and a drive motor and spindle assembly aperture 90 (FIGS. 5 and 6). In one embodiment baseplate 76 is machined from aluminum.

As shown in FIGS. 4-6, drive motor and spindle assembly 74 includes a mounting base 92 and a motor and spindle hub frame 94 which extends from the mounting base. Centering hub 95 is mounted to and extends from frame 94. Mounting base 92 is fastened to a lower surface of baseplate 76 by means of screws 96. Motor and spindle hub frame 94 extends through aperture 90 and beyond the upper surface of baseplate 76. A preferred embodiment of drive motor and spindle assembly 74 is described in copending U.S. patent application Ser. No. 246,502, filed Sept. 19, 1988 and assigned to the same assignee as the present invention. Other drive motor and spindle assemblies can also be used.

Baseplate assembly 50 is driven between its cartridge load/unload position and its operative position by drive mechanism 100. Drive mechanism 100 includes motor 102 and worm gear 104 which are mounted to front panel 20 by bracket 106. Motor 102 rotates worm gear 104 about a generally horizontal axis. As perhaps best shown in FIGS. 5 and 6, a threaded shaft 108 and coaxially mounted gear 110 are rotatably mounted in a vertical orientation adjacent worm gear 104 by means of bracket 112. Shaft 108 extends through threaded nut 114 which is attached to the lower side of baseplate 76 by screws 116. Motor 102 is controlled by the electrical subsystem of disk drive 10.

Cartridge 30 is loaded into and unloaded from disk drive 10 when baseplate assembly 50 is pivoted downward to its cartridge load/unload position shown in FIG. 5. Centering hub 95 of motor and spindle hub frame 74 is located below cartridge 30 when the cartridge is in its load/unload position. After cartridge 30 has been inserted into drive 10 and secured by retaining mechanism 48, motor 102 is actuated and causes threaded shaft 108 to rotate in a first direction forcing nut 114 and baseplate assembly 50 into its operative position shown in FIG. 6. Locating pins 118 which extend upwardly from the forward corners of baseplate 76 are then positioned in holes 40 of cartridge 30 to ensure proper alignment between baseplate assembly 50 and the cartridge. Centering hub 95 will also extend through opening 45 of cartridge 30 and engage hub 39 of optical disk 36.

With cartridge 30 latched into disk drive 10 and baseplate assembly 50 driven in its operative position, tracking motor 72 can be actuated to drive arm 70 about tracking axis 25 to position optical assembly 71 adjacent desired servo tracks 33 on disk 36. Digital information can then be written, read and erased at bit positions on servo tracks 33. If it is desired to remove cartridge 30 from drive 10 after these operations are completed, motor 102 is again actuated. When shaft 108 is rotated in a second direction baseplate assembly 50 is lowered to its cartridge load/unload position and disengaged from cartridge 30. Cartridge 30 can then be removed from drive 10 in the manner previously described.

Rotary arm 70 and tracking motor 72 can be described with reference to FIGS. 7 and 8. As shown, arm 70 includes an elongated and generally planar base 124 surrounded by a wall 126 which extends in a perpendicular direction from both sides of the base. A cylindrical pivot housing 128 is formed in wall 126 at one end 129 of arm 70, while a generally cylindrical focus and bias field switching assembly housing 130 is formed in the wall at the opposite end 131 of the arm. Housing 130 extends beyond the upper edge of wall 126 in the embodiment shown. In one embodiment the distance between the center of housing 128 and the center of housing 130 is fifty-nine and one-quarter millimeters about a longitudinal axis parallel to the portion of wall 126 opposite base 124 from the wall portion intersecting the two housings, and nine and four-tenths millimeters about a transverse axis perpendicular to the longitudinal axis. Arm 70 is fabricated from magnesium in one embodiment. The described design of arm 70 is lightweight with low inertia, yet rigid to resist bending forces.

Rotary arm 70 is pivotally mounted to baseplate 76 by pivot assembly 132. As shown in FIG. 8, pivot assembly 132 includes upper ball bearing assembly 133, lower ball bearing assembly 134, flanged sleeve 135 and bolt 136. Bearing assemblies 133 and 134 each have an inner race IR and outer race OR. Outer races OR of bearing assemblies 133 and 134 are separated by spacer 137 and bonded to the interior surface of pivot housing 128. Inner races IR of bearing assemblies 133 and 134 are preloaded (i.e. forced toward one another) and bonded to an exterior surface of sleeve 135. Arm 70 is secured to baseplate 76 by bolt 136. As shown in FIG. 8, flanged end 1 38 of sleeve 135 is positioned between baseplate 76 and arm 70, and ensures that the baseplate and arm are parallel to one another. Preloading inner races IR of bearing assemblies 133 and 134 effectively increases the virtual stiffness of the bearings and contributes to the overall performance of drive 10.

In one embodiment the distance between the center of pivot assembly 132 and the axis of rotation of drive motor and spindle assembly 74 is fifty millimeters along an axis parallel to the forward edge of the baseplate, and sixteen millimeters along an axis parallel to the side edge of the baseplate. These dimensions, along with those of arm 70 discussed above, will cause the focus and bias field switching assembly 150, mounted in housing 130 to be positioned at an almost constant predetermined angle (±4.50) with respect to the tangent of each servo track 33 on disk 36 as arm 70 is driven about tracking axis 25.

As shown in FIG. 7, all optical and optoelectronic elements of disk drive 10 (i.e. the optical head) are mounted to rotary arm 70. These elements include laser diode 142, collimator lens 144, beam shaping prism 146, turn-around prism 148, focus and bias field switching assembly 150, sensor lens 152, polarizing beam splitter 154, and optical detectors 156 and 158. Laser diode 142 is mounted within an extended portion of wall 126 and produces a laser beam 160 which is illustrated by broken lines in FIG. 7. Laser beam 160 is collimated by lens 144 before it is impinged upon beam shaping prism 146. Prism 146 changes the aspect ratio of collimated beam 160 from approximately three-to-one to one-to-one. Laser beam 160 then passes through a leaky coating (not visible) between prisms 146 and 148 before it is directed to focus and bias field switching assembly 150 from prism 148. The leaky coating allows seventy percent transmission of p-polarization components of laser beam 160 and zero percent transmission of s-polarization components. This ratio is a compromise for write and read requirements. The leaky coating also introduces little or no phase shift between the p- and s-polarization components of beam 160.

From prism 148, incident portions of laser beam 160 are directed to focus and bias field switching assembly 150 through an aperture 194 (FIG. 9) in housing 130. As will be discussed in greater detail below, focus and bias field switching assembly 150 reflects incident laser beam 160 toward and focuses the beam onto optical disk 36. The polarization angle of incident beam 160 is then modulated by the magnetic orientation of bit positions on optical disk 36 in accordance with known magneto-optic principles, and the beam reflected back to turn-around prism 148 through focusing and bias field switching assembly 150. The modulated and reflected portions of laser beam 160 are directed to polarizing beam splitter 154 through sensor lens 152 by turn-around prism 148. Sensor lens 152 shapes the reflected beam for proper focus control. Beam splitter 154 splits the modulated and reflected portions of beam 16 into its s- and p- polarization components, and impinges each of these components upon one of detectors 156 and 158. At least one of detectors 156 and 158 is capable of producing signals representative of focus and tracking errors of objective lens 170 (FIG. 9) with respect to servo tracks 3 and disk 36. Focus and tracking error signals generated as a function of the detector signals are used by focus and tracking servo systems, respectively, of the electrical subsystem to properly focus beam 160 onto disk 36 and to track desired servo tracks 33. An information signal representative of the digital state of data read from optical disk 36 is derived differentially from the signals produced by detectors 156 and 158. Detectors such as 156 and 158, as well as techniques for processing signals derived therefrom, are known. In one embodiment detectors 156 and 158 are central bar detectors of the type shown in copending U.S. patent application Ser. No. 265,219 filed Oct. 31, 1988 and assigned to the same assignee as the present invention.

Figure 9:
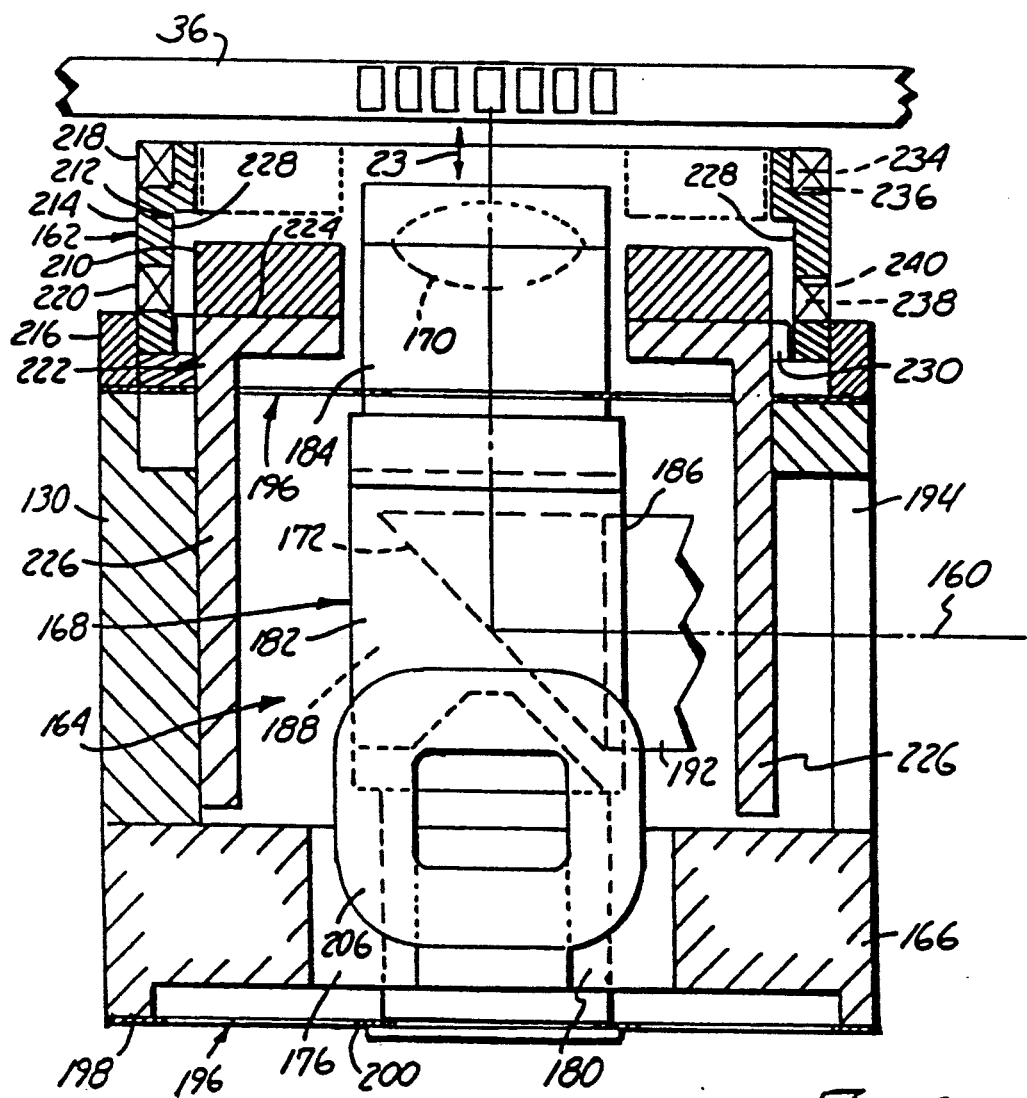
FIG. 9 is a sectional view of the focus and bias field switching assembly taken along lines 9—9 in FIG. 4.

Focus and bias field switching assembly 150 is shown in greater detail in FIGS. 9 and 10. Assembly 150 includes a focusing assembly 164 and a bias field assembly 162. Focusing assembly 164 includes a generally planar metallic pole piece 166, objective lens support 168, objective lens 170, and prism 172. Pole piece 166 is a circular member bonded by epoxy to a first or lower edge of housing 130. Pole piece 166 has a circular central aperture 174 and a pair of elongated apertures 176 positioned on opposite sides of the circular aperture. A pair of permanent magnets 178 are bonded to opposite sides of each elongated aperture 176, and are radially spaced from one another with respect to central aperture 174.

Lens support 168 is preferably a one-piece plastic member which includes a lower mounting section 180, middle prism cage section 182, and upper lens mount section 184. Sections 180, 182 and 184 are vertically spaced about the path of laser beam 160 between prism 172 and optical disk 36 (i.e., perpendicular to the disk and parallel to the optical axis of lens 170). One side of prism cage section 182 has a beam opening 186 which extends into prism cavity 188. An elongated opening 190 extends through lens support 168 between lens mount section 184 and prism cavity 188, forming a path for beam 160. Objective lens 170 is mounted within lens mount section 184 of lens support 168 using epoxy or other means. Prism 172 is positioned within cavity 188 and is fixedly mounted to housing 130 by means of a support such as 192 (FIG. 9). Beam opening 186 which extends into prism cage section 182 of lens support 168 is aligned with an opening 194 which extends through housing 130. Incident portions of laser beam 160 are directed to focus and bias field switching assembly 150 through openings 194 and 186 before being reflected by prism 172, directed through objective lens 170, and impinged upon bit positions of optical disk 36. Modulated portions of laser beam 160 which are reflected from the optical disk traverse an identical path before they are directed back through turn-around prism 148 to detectors 156 and 158.

A pair of leaf springs 196 movably and resiliently suspend lens support 168 within housing 130. Each spring 196 has a circular outer rim 198, a circular inner rim 200, and a leaf member 202 extending between the inner and outer rims. Outer rim 200 of the lower spring 196 is bonded to a lower edge of pole piece 166, while its inner rim 200 is secured to mounting section 180 of lens support 168 by fastening plug 204. Upper spring 196 has its outer rim 198 bonded to an upper edge of housing 130 and its inner rim 200 secured to lens mount section 184 of lens support 168.

A pair of wire coils 206 are secured to opposite sides of lens support 182. As shown in FIGS. 9 and 10, coils 206 extend into elongated apertures 176 between magnets 178. Magnetic fields generated by coils 206 in response to focus drive signals produced by the electrical system interact with the magnetic fields produced by magnets 178. Lens support 168 and objective lens 170 are thereby driven against the bias force of springs 200 and positioned along focus axis 23 to focus laser beam 160 onto disk 36.

Bias field assembly 162 includes an annular permanent magnet 210 and an actuator mechanism 212 for driving the magnet between write and erase positions with respect to optical disk 36. Actuator mechanism 212 includes a ring-shaped plastic coil form and magnet housing 214 which is mounted to an upper edge of housing 130 by means of mounting ring 216. Coils 218 and 220 are wound about recesses in the exterior surface of housing 214.

Actuator mechanism 212 also includes magnet sliding guide 222 which has a ring-shaped magnet receiving face 224 and a plurality of legs 226 which extend downward into housing 130 from magnet housing 214. As shown, ring magnet 210 and face 224 of guide 222 are concentrically positioned around lens mount section 184 of lens support 168. Magnet 210 and guide 222 are movable within magnet housing 214 between a write position illustrated in solid lines in FIGS. 9 and 10, and an erase position illustrated in broken lines in FIG. 9. When in its write position, magnet 210 will be positioned at a distance from optical disk 36 which causes a magnetic B field having a value less than or equal to the required write threshold to be impinged upon the bit positions onto which laser beam 160 is focused. When moved to its erase position, magnet 210 will be at a distance from disk 36 which causes a magnetic B field having a value greater than or equal to the erase threshold to be impinged upon the bit positions. With magnet 210 in its erase position, data can be erased from the bit positions The polarity of the magnetic B field which is applied to optical disk 36 when magnet 20 is in its write position is opposite the polarity of the field impinged upon the disk when the magnet is in its erase position.

Guide 222 prevents magnet 210 from becoming cocked or wedged within magnet housing 214 while it is being driven between its write and erase positions. As shown in FIG. 9, portions of legs 226 ride along an interior surface of housing 130 while guide 222 and magnet 210 are moved together. Magnet housing 214 also includes several grooves 228 on its interior surface. Guide lugs 230 which extend radially outward from the edges of guide face 224 ride within grooves 228. Lugs 230 engage mounting ring 216 when magnet 210 is in its write position, and prevent further movement of the magnet and guide 222 away from optical disk 36. The movement of magnet 210 toward optical disk 36 is limited to the erase position when lugs 230 engage the upper ends of grooves 228 Magnet 210 is held in both the write and erase positions by its magnetic attraction to ferro-magnetic members 232. Members 232 are mounted within recesses in the interior surface of magnet housing 214 adjacent magnet 210 in both its write and erase positions. The size of members 232 and the distance between them and edges of magnet 210 can be adjusted to control the retaining force needed to hold magnet 210 in its write or erase positions.

As shown in FIG. 9, coils 218 and 220 are located in planes parallel to the pole surfaces of magnet 210. Coils 218 are positioned on magnet housing 214 in such a manner that the center 234 of the plane in which they are located is positioned closer to the top edge of the magnet housing than the center 236 of the edge of magnet 210 when the magnet is in its erase position. Coils 220 are positioned on magnet housing 214 at such a location that the center 238 of the plane in which they are located is closer to the lower edge of the magnet housing than center 240 of the edge of magnet 210 when the magnet is in its write position.

Coils 218 and 220 are connected in series with one another and function in a solenoid-like manner. As indicated by the dot and arrow current flow convention used in FIG. 10, coils 218 are wound in a direction opposite that of coils 220. In response to a bias field select pulse of a first or positive polarity applied to coils 218 and 220, the magnetic fields generated by the coils will interact with the magnetic, fields of magnet 210 and force the magnet to its write position. Magnet 210 will be held in the write position by its attractive force with ferro-magnetic members 232 adjacent coils 220. When a bias field select pulse of a second or negative polarity is applied to coils 218 and 220, the magnetic fields generated by these coils will interact with the field of magnet 210 and force the magnet to its erase position. Magnet 210 will be held in its erase position by its attractive force with ferro-magnetic members 232 adjacent coils 218. The polarity of the bias field select pulse applied to coils 218 and 220 therefore determines whether magnet 210 is located in its write or erase positions.

Tracking motor 72 can be described with reference to FIGS. 4, 7, 11 and 12. Tracking motor 72 is a moving coil linear motor and includes coil assembly 122 and magnet assembly 252. Coil assembly 122 can be formed in a mold (not shown) by winding a first wire coil 244 around coil forming pins 242A-242D and a second coil 246 around pins 242E-242H. A rigid polymer base 240 is then molded around coils 244 and 246. Active portions 244A and 244B of coil 244 and active portions 246A and 246B of coil 246 are all coplanar and overlap in an arcuate central track 243 of base 240. Sides 244C and 244D of coil 244 overlap adjacent sides 246C and 246D of coil 246, and are molded into ribs or ridges 245 on the sides of track 243. Ridges 245 enhance the bending stiffness of base 240. Coil forming pins 242A-242D are removed after base 240 is completely formed.

Tracking coil assembly 122 is rigidly fastened to arm 70 by fitting base 240 between a pair of generally parallel shelves 248 which extend from the arm opposite focus and bias field switching assembly 150 from pivot assembly 132. Screw 250 and adhesive are used to bolt tracking motor coil assembly 122 to arm 70.

Magnet assembly 252 is rigidly mounted to baseplate 76 adjacent tracking coil assembly 122. Magnet assembly 252 includes a magnet mount 254 having a generally U-shaped cross section and a pair of planar faces which extend over the opposite sides of coil assembly 122. Two pair of permanent magnets 256 and 258 are mounted on the interior surface of each face of magnet mount 254, and are positioned between ridges 245 in track 243 of base 240. Magnets 256 and 258 are parallel to coils 244 and 246. In response to tracking drive signals applied to coils 244 and 246 by the electrical system, magnetic fields produced by the coils will interact with the magnetic fields of magnets 256 and 258, and drive arm 70 in a plane parallel to disk 36. Objective lens 170 and laser beam 160 can thereby track or be centered over desired servo tracks 33 on disk 36.

An electrical system 290 of optical disk drive 10 can be described generally with reference to FIG. 17. As shown, switch 15, LED display 17, baseplate assembly drive motor 102, laser 142, detectors 156, 158, focus motor coils 206, bias switching assembly coils 218, 220, tracking motor coils 244, 246 and Hall-effect sensors 262 are all interfaced to control and signal processing circuitry 292. Control and signal processing circuitry 292 is interfaced to a host computer over bus 294. In one preferred embodiment, control and signal processing circuitry 292 includes a programmable digital signal processor and associated memory which are mounted to the inside surface of top panel 12.

After an operator has inserted cartridge 30 into drive 10, control and signal processing circuitry 292 will monitor Hall-effect sensors 262 to determine whether or not cartridge door 34 has been properly opened to allow access to disk 36. If sensors 262 indicate that door 34 has been opened, motor 102 will be actuated to raise baseplate assembly 50 from its load/unload position to its operative position. Centering hub 95 of drive motor and spindle assembly 74 will then engage hub 39 of disk 36. Drive motor and spindle assembly 74 are subsequently actuated to rotate optical disk 36.

Once disk 36 is being rotated at the correct speed, laser 142 will generate and impinge laser beam 160 upon the disk. Tracking and focus servo systems, which include control and signal processing circuitry 292, will generate tracking and focus drive signals in response to signals provided by detectors 156 and/or 158. The focus and tracking drive signals are applied to focus and tracking motor coils 206 and 244, 246, respectively, to keep laser beam 160 in focus and tracking servo tracks 33 on disk 36. The intensity of laser beam 160 is modulated and switched between intensity levels in phase with bias field switching signals applied to bias field switching assembly coils 218, 220 to read, write and erase data at individual bit positions on disk 36. The information written to and read from disk 36 is transmitted between circuitry 292 and the host computer over bus 294.

Switch 15 is actuated when the operated wants to remove cartridge 30 from disk drive 10. In response to the actuation of switch 15, control and signal processing circuitry 292 provides a stop request to the host computer. After data transfer with the host computer has been completed, drive motor and spindle assembly 74 is stopped to allow the optical disk to spin down. After disk 36 has come to a complete stop, baseplate assembly 50 drive motor 102 will be actuated and drive baseplate assembly 50 to its load/unload position. The operator can then remove cartridge 30 from disk drive 10 in the manner previously described. The operating status of disk drive 10 is indicated to the operator by LED display 17.

Disk drive 10 has considerable advantages over those of the prior art. The low profile and compact nature of all of its components, including baseplate assembly 50, rotary arm 70, tracking motor 72, and focus and bias field switching assembly 150 facilitate assembly into a half-height enclosure. By positioning tracking motor 72 directly adjacent to focus and bias field switching assembly 150 (i.e. by direct coupling these two assemblies), and opposite the assembly from pivot mechanism 130, the effects of arm and bearing dynamics upon tracking servo system response are reduced. The phase and magnitude of movement of objective lens 170 are caused by the forces generated by tracking motor 72, and are primarily determined by the stiffness of coupling between coils 244, 246 and the objective lens. This stiffness is not controlled by the structure of arm 70 between objective lens 170 and pivot assembly 132, or by bearing 134. In short, arm and bearing dynamics have been removed from the force-position loop in the direct coupled rotary path actuator. The effects of bearing friction and wear are thereby minimized. The high degree of coupling between coils 244, 246 and magnets 256, 258 permits the use of larger magnets and higher tracking accelerations with lower power. The actuator arrangement also allows the optical elements of the drive to be distributed and built between pivot 132 and tracking motor 72 on arm 70 of low interia.

Although the present invention has been described with reference to preferred embodiments, workers skilled in the art will recognize that changes may be made in form and detail without departing from the spirit and scope of the invention.

What is claimed is:

1. An optical disk drive for use with an optical disk, including:
    an enclosure;
    a drive motor mounted within the enclosure for receiving and rotating an optical disk;
    a rigid rotary arm;
    pivot mechanism for pivotally mounting the rotary arm with respect to the enclosure for rotary arm movement in a plane parallel to the optical disk;
    an objective lens mounted to the rotary arm and displaceable relative thereto for focusing a laser beam onto the optical disk;
    an objective lens mount for mounting the objective lens to the rotary arm for movement along a linear focus axis perpendicular to the disk;
    a focus motor for driving and positioning the objective lens along the focus axis without deflecting the rotary arm from its plane of rotation; and
    a tracking motor for applying driving forces to the rotary arm at a location adjacent the objective lens, to position the objective lens about a tracking axis with resect to the optical disk;
    wherein the objective lens mount includes:
        a tubular lens support having a longitudinal axis;
        means for mounting the objective lens in the tubular lens support; and
        a resilient mount for resiliently mounting he lens support to the rotary arm with the longitudinal axis parallel to the focus axis;
    wherein the tubular lens support includes:
        a lens mount section in which the objective lens is mounted;

a support mount section; and a prism cage section having a laser beam receiving aperture between the lens mount section and the support mount section, the lens mount section, support mount section and prism cage section being positioned with respect to one another about the longitudinal axis;

wherein the resilient mount includes:

a first leaf spring for supporting the support mounting section of the lens support with respect to the rotary arm; and a second leaf spring for supporting the lens mount section of the lens support with respect to the rotary arm.

2. The optical disk drive of claim 1 and further including a prism fixedly mounted to the rotary arm and positioned inside the prism cage section of the lens support, for reflecting a laser beam between the beam receiving aperture and the objective lens.

3. An optical disk drive for use with an optical disk, including:

an enclosure;

a drive motor mounted within the enclosure for receiving and rotating an optical disk;

a rigid rotary arm;

pivot mechanism for pivotally mounting the rotary arm with respect to the enclosure for rotary arm movement in a plane parallel to the optical disk;

an objective lens mounted to the rotary arm and displaceable relative thereto for focusing a laser beam onto the optical disk;

an objective lens mount for mounting the objective lens to the rotary arm for movement along a linear focus axis perpendicular to the disk;

a focus motor for driving and positioning the objective lens along the focus axis without deflecting the rotary arm from its plane of rotation; and a tracking motor for applying driving forces to the rotary arm at a location adjacent the objective lens, to position the objective lens about a tracking axis with resect to the optical disk;

wherein the objective lens mount includes:

a tubular lens support having a longitudinal axis;

means for mounting the objective lens in the tubular lens support; and a resilient mount for resiliently mounting he lens support to the rotary arm with the longitudinal axis parallel to the focus axis;

wherein the focus motor includes:

planar coils mounted to the lens support parallel to the longitudinal axis; and permanent magnets adjacent the coil means.

4. The optical disk drive of claim 3 wherein: the planar coils include a pair of planar coils mounted to opposite sides of the lens support; and the permanent magnets include two pair of permanent magnets, each pair mounted adjacent to and on opposite sides of a planar coil.

5. The optical disk drive of claim 4 and further including a metal pole piece to which the permanent magnets are mounted.

6. An optical disk drive for use with an optical disk, including:

an enclosure;

a drive motor mounted within the enclosure for receiving and rotating an optical disk;

a rigid rotary arm;

pivot mechanism for pivotally mounting the rotary arm with respect to the enclosure for rotary arm movement in a plane parallel to the optical disk;

an objective lens mounted to the rotary arm and displaceable relative thereto for focusing a laser beam onto the optical disk;

an objective lens mount for mounting the objective lens to the rotary arm for movement along a linear focus axis perpendicular to the disk;

a focus motor for driving and positioning the objective lens along the focus axis without deflecting the rotary arm from its plane of rotation;

a tracking motor for applying driving forces to the rotary arm at a location adjacent the objective lens, to position the objective lens about a tracking axis with resect to the optical disk;

a baseplate to which the drive motor, the rotary arm and at least portions of the tracking motor are mounted; a baseplate mount for movably mounting the baseplate within the enclosure; and a baseplate drive for driving the baseplate between a load/unload position at which the drive motor is disengaged from the optical disk, and an operative position at which the rotary arm and objective lens are positioned adjacent the optical disk and the drive motor is engaged with the optical disk;

wherein the drive is adapted for use with an optical disk cartridge of the type having an enclosure with a disk access opening, an optical disk within the enclosure, and a door covering the opening, and further comprises a cartridge retaining mechanism including:

a guide track for guiding the cartridge to an inserted position within the enclosure;

a cartridge latch for releasably latching the cartridge in its inserted position; and a door opening mechanism for opening the cartridge door;

wherein the cartridge latch includes a push-latch mechanism actuated when engaged by the cartridge;

wherein the cartridge enclosure includes at least one latch aperture and the push-latch mechanism includes:

a unidirectional cardioid cam surface having latched and unlatched stop positions;

a slidable latch member slidably mounted adjacent the cam surface;

a cam follower coupling the slidable latch member to the cam surface;

a spring for biasing the slidable latch member with respect to the cam surface; and a latch clip mounted to the slidable latch member, wherein when the cartridge is pushed into the drive and engages and forces the latch member against the bias force of the spring, the cam follower travels to and is releasable set in its latched stop position with the latch clip engaged with the cartridge latch aperture when the cartridge is in its inserted position, and when the inserted cartridge is subsequently pushed to engage and force the latch member against the bias force and the spring, the cam follower travels to and is releasably set in its unlatched position with the latch clip disengaged from the latch aperture and the cartridge forced at least partially out of the drive.

7. An optical disk drive for use with an optical disk, including:
- an enclosure;
- a drive motor mounted within the enclosure for receiving and rotating an optical disk;
- a rigid rotary arm;
- a pivot mechanism for pivotally mounting the rotary arm with respect to the enclosure for rotary arm movement in a plane parallel to the optical disk;
- an objective lens mounted to the rotary arm and displaceable relative thereto for focusing a laser beam onto the optical disk;
- an objective lens mount for mounting the objective lens to the rotary arm for movement along a linear focus axis perpendicular to the disk;
- a focus motor for driving and positioning the objective lens along the focus axis without deflecting the rotary arm from its plane of rotation;
- a tracking motor for applying driving forces to the rotary arm at a location adjacent the objective lens, to position the objective lens about a tracking axis with resect to the optical disk;
- a baseplate to which the drive motor, the rotary arm and at least portions of the tracking motor are mounted; a baseplate mount for movably mounting the baseplate within the enclosure; and
- a baseplate drive for driving the baseplate between a load/unload position at which the drive motor is disengaged from the optical disk, and an operative position at which the rotary arm and objective lens are positioned adjacent the optical disk and the drive motor is engaged with the optical disk;
- wherein the drive is adapted for use with an optical disk cartridge of the type having an enclosure with a disk access opening, an optical disk within the enclosure, and a door covering the opening, and further comprises a cartridge retaining mechanism including:
  - a guide track for guiding the cartridge to an inserted position within the enclosure;
  - a cartridge latch for releasably latching the cartridge in its inserted position; and
  - a door opening mechanism for opening the cartridge door;
  - a sensor for sensing whether the cartridge door is opened when a cartridge is in its inserted position.

8. An optical disk drive for use with a cartridge including an optical disk within an enclosure, including:
- a half-height drive enclosure;
- a cartridge retaining mechanism for releasably receiving and latching the optical disk cartridge within the enclosure;
- a baseplate movably mounted within the enclosure adjacent the cartridge retaining mechanism;
- a drive motor mounted to the baseplate for engaging and rotating the optical disk;
- a rigid rotary arm having first and second opposite ends;
- a pivot assembly for pivotally mounting the rotary arm to the baseplate for rotary arm movement;
- an objective lens mounted to the rotary arm between the first and second ends and adjacent the second end, for focusing a laser beam;
- a coil assembly mounted to the second end of the rotary arm directly adjacent to the objective lens;
- a magnet assembly mounted to the baseplate adjacent the coil assembly;
- a circuit coupled to the coil assembly for producing tracking drive signals causing the coil assembly and magnet assembly to interact and apply driving forces to the rotary arm at a location adjacent the objective lens to position the objective lens about a tracking axis with respect to the optical disk; and
- a baseplate drive for driving the baseplate between a load/unload position at which the cartridge can be inserted into and removed from the drive, and an operative position at which the rotary arm is adjacent the optical disk and the drive motor is engaged with the optical disk.

9. The optical disk drive of claim 8 wherein:
- the coil assembly includes at least two generally planar and overlapping sets of coils mounted to the rotary arm; and
- the magnet assembly includes permanent magnets on opposite sides of the sets of coils.

10. The optical disk drive of claim 9 and further including:
- an objective lens mount for mounting the objective lens to the rotary arm for movement about a focus axis perpendicular to the rotary arm; and a focus motor for driving and positioning the objective lens relative to the rotary arm about the focus axis.

11. The optical disk drive of claim 10 and further including:
- a laser mounted to the rotary arm for producing a laser beam;
- optics for directing the laser beam between the laser and objective lens; and
- a detector for detecting portions of the laser beam modulated by and reflected from the optical disk, and for producing signals representative thereof.

12. The optical disk drive of claim 11 wherein the cartridge retaining mechanism includes:
- a guide track for guiding the cartridge to an inserted position within the enclosure;
- a cartridge latch for releasably latching the cartridge in its inserted position; and
- a door opening mechanism for opening the cartridge door.

13. The optical disk drive of claim 12 wherein the guide track includes a pair of track members mounted to opposite sides of the enclosure.

14. The optical disk drive of claim 13 wherein the cartridge latch includes a push-latch mechanism actuated when engaged by the cartridge.

15. The optical disk drive of claim 14 wherein the cartridge enclosure includes at least one latch aperture and the push-latch mechanism includes:
- a unidirectional cardioid cam surface having latched and unlatched stop positions;
- a slidable latch member slidably mounted adjacent the cam surface;
- a cam follower coupling the slidable latch member to the cam surface; a spring for biasing the slidable latch member with respect to the cam surface; and
- a latch clip mounted to the slidable latch member, wherein when the cartridge is pushed into the drive and engages and forces the latch member against the bias force of the spring, the cam follower travels to and is releasably set in its latched stop position with the latch clip engaged with the cartridge latch aperture when the cartridge is in the inserted position, and when the inserted cartridge is subsequently pressed to engage and force the latch member against the bias force of the spring the cam follower travels to and is releasably set in its unlatched position with the latch disengaged from the latch aperture and the cartridge forced at least partially out of the drive.

16. The optical disk drive of claim 15 and further including a sensor for sensing whether the cartridge door is open when the cartridge is in its inserted position.

17. The optical disk drive of claim 11 and including a baseplate mount for pivotally mounting the baseplate to the enclosure.

* * * * *